United States Patent [19]

Steineke

[11] 3,996,340

[45] Dec. 7, 1976

[54] METHOD OF PRODUCING ALUMINUM FLUORIDE

[75] Inventor: Fredrik Steineke, Trondheim, Norway

[73] Assignee: Elkem-Spigerverket, Oslo, Norway

[22] Filed: Aug. 21, 1975

[21] Appl. No.: 606,434

Related U.S. Application Data

[63] Continuation-in-part of Ser. No. 416,375, Nov. 16, 1973, abandoned.

[30] Foreign Application Priority Data

Dec. 12, 1972  Norway ............................ 4575/72

[52] U.S. Cl. ................................ 423/489; 423/485
[51] Int. Cl.² .......................................... C01B 9/08
[58] Field of Search ........................... 423/485, 489

[56] References Cited

UNITED STATES PATENTS

| | | | |
|---|---|---|---|
| 3,469,939 | 9/1969 | Aiso et al. | 423/485 |
| 3,719,747 | 3/1973 | Hayford | 423/485 |

FOREIGN PATENTS OR APPLICATIONS

| | | | |
|---|---|---|---|
| 279,392 | 4/1965 | Australia | 423/489 |
| 537,403 | 8/1962 | Canada | 423/489 |
| 629,393 | 10/1961 | Canada | 423/489 |

*Primary Examiner*—Oscar R. Vertiz
*Assistant Examiner*—Gregory A. Heller
*Attorney, Agent, or Firm*—Eyre, Mann, Lucas & Just

[57] ABSTRACT

A method of disposing of silica dust recovered from the smoke of metallurgical furnaces by producing aluminum fluoride therefrom for use in electrolytic melting furnaces is disclosed. Fluorspar and the precipitated amorphous silicon dioxide are treated with steam at elevated temperatures whereby hydrogen fluoride-containing gases are produced and then these gases are passed through a layer of aluminum oxide. Part of the gaseous hydrogen fluoride will then react with the alumina to form aluminum fluoride and part of it will be adsorbed in the alumina whereby an intimate mixture of alumina and fluorine is obtained which is useful in electrolytic furnaces.

7 Claims, No Drawings

METHOD OF PRODUCING ALUMINUM FLUORIDE

The present application is a continuation-in-part of Application Ser. No. 416,375 filed Nov. 16, 1973, now abandoned.

The present invention relates to a method of disposing of silica dust recovered from the smoke of metallurgical furnaces by producing aluminum fluoride, and more particularly a mixture of aluminum fluoride with aluminum oxide. The combined product is quite useful in furnaces for the melt electrolytic production of aluminum.

In the melt elecrolytic production of aluminum, the raw material employed, as is well known, is aluminum oxide, i.e., alumina. As is also known, aluminum fluoride and/or cryolite are added to the alumina since alumina is soluble in these molten compounds and dissociable thus permitting the electro-deposition of the aluminum metal. The fluorides further lower the melting temperature of the bath and adjust the pH of the melt.

While the fluoride components are necessary, they are also quite expensive. Because of their expense and also because of increasingly stringent environmental controls, aluminum producers have to an increasing degree sought to recover the fluorine components both from the furnace gases and from solid wastes such as soot, scum, and used furnace linings and furnaces bottoms. Unfortunately, the recovery processes are not efficient enough to recover all of the fluorine and it is therefore necessary to continuously add fresh fluorine material in order to maintain the proper fluoride balance in the furnace for deposition of aluminum.

The applicant has discovered that aluminum fluoride suitable for use in the melt electrolytic production of aluminum can be obtained from fluorspar, a comparatively inexpensive material and the silica dust recovered from the smoke of metallurgical processes producing materials high in silicon content, e.g. silicon metal and silicon-rich alloys. The fluorspar is combined with the silicon dioxide and is then subjected to treatment with steam at elevated temperatures. This steam treatment of the fluorspar-silica mixture results in the generation of hydrogen fluoride-containing gases. These gases containing hydrogen fluoride are then passed through a layer of alumina. Part of the gaseous hydrogen fluoride will react with the aluminum oxide to form aluminum fluoride components and part of the gaseous hydrogen fluoride will be adsorbed in the aluminum oxide. The thus obtained fluorine-containing alumina can then be introduced to the furnace to provide the necessary fluorine for the melt electrolytic production of aluminum.

In the preferred embodiment of the invention, the fluorspar is very finely ground combined with the silica dust and then pelletized or briquetted to agglomerates of a size suitable for fluidized bed reaction. A steam-air mixture at a temperature of about 1,000°–1,200° C. is then passed through the mixture of fluorspar and slica which results in the generation of hydrogen fluoride-containing gases. While higher and lower percentages of steam can be employed under special circumstances, the steam content of the gas should preferably be from about 40–60% by volume.

The process can be carried out in combustion or fluidizing equipment, both of which are well known in the art. At many aluminum plants today there are in existence units for the recovery of fluorine by pyrohydrolysis of furnace bottoms and linings and these units are suitable for carrying out the process of the present invention.

The silicon dioxide material should contain at least 30% silia by weight. In the preferred embodiment, the silicon dioxide material is at least 40% silica. The silica material is the silica dust recovered from the smoke of metallurgical processes for the production of metallic silicon or alloys having a high silicon content. The advantage of using these silicon materials is not only that they are finely divided and hence do not have to be additionally pulverized but also that it provides a use for these dusts. These dusts must be recovered in most countries since they are a pollutant if they are released to the atmosphere. While there have been some uses to which these dusts have been put, there is still a very great excess of these dusts thus presenting a disposal problem. Typical furnaces producing ferro-silicon alloys produce around 7 tons per day of these dusts and there are many hundreds of such furnaces in the United States alone. Such huge quantities of dust present equally huge disposal problems. The instant use of these dusts helps to alleviate this problem.

The methods of recovering silica dusts from the smoke of metallurgical processes producing material high in silicon content are well known in the art. While precipitation methods such as electrostatic precipitators are sometimes employed, the preferred methods in use today employ baghouse filters.

A further and very important advantage to the use of these silica dusts is that the silica dusts recovered from the smoke of metallurgical processes are amorphous. In known processes the silica employed is crystalline. There are many advantages to the use of these amorphous silicas over the use of crystalline silicas. Among these are the following:

1. the use of the slica dusts precipitated from metallurgical processes provides a means of disposing of these dusts and thus reduces disposal problems;
2. the precipitated silica dusts are amorphous whereas the silicas previously employed were crystalline;
3. whereas it is necessary to crush crystalline silica in order to have a satisfactory reaction, crushing is not necessary with amorphous silica dusts;
4. the amorphous silica particles precipitated from the smoke of metallurgical furnaces have an average diameter of below about one micron (predominantly in the range of about 0.03 to 0.3 microns) and have a large active surface which makes possible a rapid reaction with the fluorspar;
5. amorphous silica dusts have spherical surfaces whereas the crushed silicas are sharp edged crystals, a state that is not nearly as desirable from a reaction point of view;
6. amorphous silica dusts are very excellently suited for pelletizing with the fluorspar both because of their amorphous state and their very small size.

A number of tests were conducted in accordance with the present invention. In each of these tests, fluorspar and recovered amorphous silica dusts were admixed in various ratios and pelletized to an average size of approximately 3mm. The thus pelletized dust at various ratios of $CaF_2/SiO_2$ and at various temperatures were treated with a steam-air mixture containing approximately 50% steam. The results of the test are given below:

| Ratio CaF$_2$/SiO$_2$ | Temperature °C | % H$_2$O in gas | % F in ashes | % F yield |
|---|---|---|---|---|
| 1 : 1 | 1000 | 54 | 5.71 | 68.6 |
| 1 : 2 | 1000 | 53 | 3.69 | 70.6 |
| 1 : 3 | 1000 | 51 | 2.37 | 74.3 |
| 1 : 1 | 1100 | 53 | 5.36 | 70.6 |
| 1 : 2 | 1100 | 51 | 2.77 | 77.9 |
| 1 : 3 | 1100 | 53 | 1.71 | 81.4 |
| 1 : 1 | 1200 | 59 | 1.74 | 90.4 |
| 1 : 2 | 1200 | 57 | 0.68 | 94.6 |
| 1 : 3 | 1200 | 57 | 0.62 | 93.3 |

It is thus seen that fluorine yields of up to 94.6% can be obtained.

It is not necessary to limit the fluorspar-silica mixture to these two components alone. For example, this mixture may also suitably contain soot or ground material from used bottoms and linings of electrolytic smelting furnaces. These materials will also have fluorine which will be converted to hydrogen fluoride when subjected to steam treatment and they are thus advantageously employed if they are available.

It will be understood that the claims are intended to cover all changes and modifications of the preferred embodiments of the invention, herein chosen for the purpose of illustration, which do not constitute departures from the spirit and scope of the invention.

What is claimed is:

1. The method of disposing of the silica dust recovered from the smoke of metallurgical processes for the production of metallic silicon or alloys having a high silicon content by using it to make a product which can be used in furnaces for the melt electrolytic production of aluminum comprising:
    a. recovering amorphous silica dust from the smoke of metallurgical processes for the production of metallic silicon or alloys having a high silicon content said silicon dust having an average diameter of no greater than about 1 micron;
    b. admixing fluorspar with said silica dust in a ratio of from about one to about three parts calcium fluoride per part of said silica dust;
    c. treating the fluorspar-silica dust mixture with a gas-stream mixture at a temperature of from about 1,000° to about 1,200° C. whereby hydrogen fluoride-containing gases are evolved;
    d. bringing the hydrogen fluoride-containing gases into contact with aluminum oxide whereby at least part of the hydrogen fluoride reacts to form aluminum fluoride suitable for use in furnaces for the melt electrolytic production of aluminum.

2. The method of claim 1 wherein the gas-steam mixture contains from about 40 to about 60% steam by volume.

3. The method of claim 1 wherein the fluorspar and silica dust are combined as dusts and pelletized to an average size of about 3mm.

4. The method of claim 1 wherein the fluorspar-silica dust mixture additionally contains at least one material selected from the group consisting of soot and ground material from the bottoms and linings of electrolytic smelting furnaces.

5. The method of claim 1 wherein the steam treatment of the fluorspar-silica dust mixture is a fluidized bed reaction.

6. The method of claim 1 further including the step of utilizing the aluminum fluoride in a furnace for the melt electrolytic production of aluminum.

7. The method of disposing of the silica dust recovered from the smoke of metallurgical processes for the production of metallic silicon or alloys having a high silicon content by using it to make a product which can be used in furnaces for the melt electrolytic production of aluminum comprising:
    a. recovering amorphous silica dust from the smoke of metallurgical processes for the production of metallic silicon or alloys having a high silicon content, said silicon dust having an average diameter of no greater than about 1 micron;
    b. admixing fluorspar with said silica dust in a ratio of from about one to about three parts calcium fluoride per part of said silica dust;
    c. treating the fluorspar-silica dust mixture with a gas-steam mixture containing from about 40 to about 60% steam by volume at a temperature of from about 1,000° to about 1,200° C whereby hydrogen fluoride-containing gases are evolved at a fluorine yield as high as 94.6%;
    d. bringing the hydrogen fluoride-containing gases into contact with aluminum oxide whereby at least part of the hydrogen fluoride reacts to form aluminum fluoride suitable for use in furnaces for the melt electrolytic production of aluminum.

* * * * *